(12) United States Patent
Chehade et al.

(10) Patent No.: US 8,660,880 B2
(45) Date of Patent: Feb. 25, 2014

(54) SYSTEM AND METHOD FOR WORKFLOW ENABLED LINK ACTIVATION

(75) Inventors: Fadi B. Chehade, Manhattan Beach, CA (US); Tony P. Curwen, San Juan Capistrano, CA (US); Christopher S. Gift, Mission Viejo, CA (US); Elie Kawand, Laguna Beach, CA (US); Linda York, San Juan Capistrano, CA (US)

(73) Assignee: International Business Machines Corporation, Armonk, NY (US)

(*) Notice: Subject to any disclaimer, the term of this patent is extended or adjusted under 35 U.S.C. 154(b) by 2189 days.

(21) Appl. No.: 10/793,187

(22) Filed: Mar. 4, 2004

(65) Prior Publication Data

US 2005/0197970 A1 Sep. 8, 2005

(51) Int. Cl.
*G06Q 10/00* (2012.01)

(52) U.S. Cl.
USPC ........ 705/7.23; 705/7.27; 705/7.36; 705/7.38

(58) Field of Classification Search
USPC ............. 705/1.1, 7.13, 7.17, 7.23, 7.27, 7.39
See application file for complete search history.

(56) References Cited

U.S. PATENT DOCUMENTS

| | | | |
|---|---|---|---|
| 3,249,919 | A | 5/1966 | Scantlin |
| 3,573,747 | A | 4/1971 | Adams et al. |
| 5,237,157 | A | 8/1993 | Kaplan |
| 5,251,205 | A | 10/1993 | Callon et al. |
| 5,285,383 | A | 2/1994 | Lindsey et al. |
| 5,297,032 | A | 3/1994 | Trojan et al. |
| 5,761,661 | A | 6/1998 | Coussens et al. |
| 5,845,266 | A | 12/1998 | Lupien et al. |
| 6,023,686 | A | 2/2000 | Brown |
| 6,035,287 | A | 3/2000 | Stallaert et al. |
| 6,256,773 | B1 * | 7/2001 | Bowman-Amuah .......... 717/121 |
| 6,336,105 | B1 | 1/2002 | Conklin et al. |
| 6,397,191 | B1 | 5/2002 | Notani et al. |
| 6,625,581 | B1 | 9/2003 | Perkowski |

(Continued)

FOREIGN PATENT DOCUMENTS

| | | |
|---|---|---|
| JP | 2003178222 A | 6/2003 |
| JP | 2003308444 A | 10/2003 |

(Continued)

OTHER PUBLICATIONS

"RosettaNet Executive Overview", Retrieved on May 3, 2000, pp. 1-12.*

(Continued)

*Primary Examiner* — Dean T Nguyen
(74) *Attorney, Agent, or Firm* — Schmeiser, Olsen & Watts, LLP; John R. Pivnichny

(57) ABSTRACT

Embodiments of the invention provide a method and system for network-based workflow enabled project management that allows trade gateways to be established between a business entity and one or more trading partners. Embodiments of the invention facilitate, through the use of computer networks-based interfaces, the stages of assessment planning and assessing the readiness of partners, implementing the trade gateways, testing the gateways and migrating the gateways to production. Embodiments of the invention provide efficient on-boarding with a participant collaboration system, a consolidated view of readiness data of participants and activation schedules. A system embodying the invention also provides real-time reports with details of participant readiness assessment, integration plans, individual process implementation schedules for complete on-boarding status, and project management functionality comprising workflow alert capabilities.

16 Claims, 8 Drawing Sheets

(56) References Cited

U.S. PATENT DOCUMENTS

| | | | |
|---|---|---|---|
| 6,671,692 B1* | 12/2003 | Marpe et al. | 707/102 |
| 6,772,216 B1 | 8/2004 | Ankireddipally et al. | |
| 6,952,768 B2 | 10/2005 | Wray | |
| 6,976,075 B2 | 12/2005 | Ma | |
| 7,051,071 B2 | 5/2006 | Stewart et al. | |
| 7,069,234 B1* | 6/2006 | Cornelius et al. | 705/26 |
| 7,080,092 B2* | 7/2006 | Upton | 707/102 |
| 7,130,807 B1 | 10/2006 | Mikurak | |
| 7,257,637 B2 | 8/2007 | Takahashi et al. | |
| 7,269,744 B1 | 9/2007 | Shippy et al. | |
| 7,275,057 B2 | 9/2007 | Imanishi et al. | |
| 7,562,041 B2 | 7/2009 | Chehade et al. | |
| 7,620,570 B2 | 11/2009 | Albazz et al. | |
| 2001/0039570 A1 | 11/2001 | Stewart et al. | |
| 2002/0019797 A1 | 2/2002 | Stewart et al. | |
| 2002/0026433 A1 | 2/2002 | Kulper | |
| 2002/0026630 A1 | 2/2002 | Schmidt et al. | |
| 2002/0029201 A1 | 3/2002 | Barzilai et al. | |
| 2002/0032622 A1 | 3/2002 | Petit et al. | |
| 2002/0032717 A1 | 3/2002 | Malan et al. | |
| 2002/0042757 A1 | 4/2002 | Albazz et al. | |
| 2002/0042782 A1 | 4/2002 | Albazz et al. | |
| 2002/0046081 A1 | 4/2002 | Albazz et al. | |
| 2002/0046301 A1 | 4/2002 | Shannon et al. | |
| 2002/0052824 A1 | 5/2002 | Mahanti et al. | |
| 2002/0059253 A1 | 5/2002 | Albazz et al. | |
| 2002/0065885 A1 | 5/2002 | Buonanno et al. | |
| 2002/0128946 A1 | 9/2002 | Chehade et al. | |
| 2002/0147622 A1 | 10/2002 | Drolet et al. | |
| 2003/0093575 A1* | 5/2003 | Upton | 709/310 |
| 2003/0135482 A1 | 7/2003 | Takahashi et al. | |
| 2003/0202638 A1* | 10/2003 | Eringis et al. | 379/15.01 |
| 2003/0208526 A1 | 11/2003 | Imanishi et al. | |
| 2004/0177028 A1* | 9/2004 | Francis et al. | 705/37 |
| 2004/0230447 A1* | 11/2004 | Schwerin-Wenzel et al. | 705/1 |
| 2009/0276624 A1 | 11/2009 | Chehade et al. | |

FOREIGN PATENT DOCUMENTS

| | | | |
|---|---|---|---|
| JP | 2004503036 A | 1/2004 | |
| JP | 2004511842 A | 4/2004 | |
| JP | 2005506618 A | 3/2005 | |
| WO | 0205508 A2 | 1/2002 | |
| WO | 0215515 A2 | 2/2002 | |
| WO | 0227614 A1 | 4/2002 | |
| WO | 02056147 A2 | 7/2002 | |
| WO | 03030063 A1 | 4/2003 | |
| WO | 03034228 A1 | 4/2003 | |

OTHER PUBLICATIONS

Valacich, J.S. "Essentials of Systems Analysis and Design", 2nd edition, 2001, Pearson Education, Inc., pp. 1-18.*
Google Patent Search, Sep. 24, 2013.*
Mak, H.Y. "Building online crisis management support using workflow system", Decision Support System, vol. 25, Issue 3, Apr. 1999, pp. 209-224.*
Jorgensen, H.D.,"Interactive Process Models", Jan. 7, 2004, Dep. of Computer and Information Science, Norwegian University of Science and Technology, Trondheim, Norway, pp. 1-290.*
RosettaNet Econcert Econcert Survival Guide, Jun. 27-29, 2000, Netfish Technologies, Inc.
DCI NetSession: Maximizing the Benefits of RosettaNet Standards [online], [retrieved on May 3, 2000]. Retrieved on the Internet: <URL: http://www.dci,com/netsessions/events/rosettanet.htm>.
RosettaNet Executive Overview [online], [retrieved on May 3, 2000]. Retrieved on the Internet: <URL:; http://www.rosettanet.org/general/overview.html>.
Welcome to RosettaNet [online], [retrieved on Jul. 10, 2000]. Retrieved from the Internet: <URL: http://www.rosettanet.org/>.
Dictionaries [online], [retrieved on Jul. 12, 2000). Retrieved from the Internet: <URL: http://www.rosettanet.org/general/dictionaries.htm>.
RosettaNet Executive Overview [online], [retrieved on Jul. 12, 2000]. Retrieved from the Internet: <URL: http://www.rosettanet.org/general/overview.html>.
Archive Managing B2B Transaction Information, Oct. 2000, Archive Inc., Culver City, California.
RosettaNet Implementation Framework Specification Version 1.1, Nov. 8, 1999.
RosettaNet Technical Dictionary to UN/SPSC Mapping Guide, RosettaNet UN/SPSC Users Guide [online], [retrieved on Jul. 12, 2000]. Retrieved from the Internet: <URL: http://apps.rosettanet.org/library/econcert.nsf/.
Archive Business-to Business Transaction Archiving, Dec. 1999, Archive, Inc., Culver City, California.
Archive Technical Brief, Dec. 1999, Archive, Inc., Culver City, California.
Archive Technical Brief [online], Archive, Inc., Mar. 2001 [retrieved on May 7, 2001]. Retrieved from the Internet: <URL: http://www.archive.com>.
Archive White Paper [online], Archive, Inc., Mar. 2001 [retrieved on May 7, 2001]. Retrieved from the Internet: <URL: http://www.archive.com>.
Executive Overview: Managing Real B2B Integration [online], Vitria Technology, Inc. [retrieved on May 4, 2001]. Retrieved from the Internet: <URL: http://www.vitria.com>.
webMethods and Technology Solutions Company Partner to Deliver Rapid Business-to Business Integration (B2B) Solutions, Press Releases [online], webMethods, Inc., Aug. 30, 2000 [retrieved on May 4, 2001]. Retrieved fromt the Internet: <URL: http://www.webmethods.com/press_release_detail/1,1075,721,00.html>.
webMethods B2Bi Solution Suite: Leverage a Complete and Effective Integration Software Package [online]. webMethods, Inc. [retrieved from May 4, 2001]. Retrieved from the Internet: <URL: http://www.webmethods.com/content/1,1107, B2BiSolutions, FF.html>.
Connie Guglielmo, Talking The E-Biz Talk [online]. Ziff Davis, Inc., Jun. 8, 1998 [retrieved on May 2, 2001]. Retrieved from the Internet: <URL: http://www.zbnet.com/intweek/daily/980608e.html>.
Robin Cover, The XML Cover Pages, Electronic Business XML Initiative (ebXML) [online]. Robin Cover and OASIS, Apr. 25, 2001 [retrieved on May 2, 2001]. Retrieved from the Internet: <URL: http://www.oasis-open.org/cover/ebXML.html>.
David Webber and Anthony Dutton, Understanding ebXML, UDDI and XML/edi, XML.ORG—The XML Industry Portal [online]. XMLGlobal, Oct. 2000 [retrieved on May 2, 2001]. Retrieved from the Internet: <URL: http://www.xml.org/feature_articles/2000_1107_miller.shtml>.
Global Manufacturers and Retailers Adopt ebXML, Oasis News [online]. Oasis, Mar. 20, 2000 [retrieved on May 2, 2001]. Retrieved from the Internet: <URL: http://www.oasis-open.org/news/oasis_news_09_11_00.shtml>.
Kara Edwards, ebXL: A Global Initative, Advisor [online]. Advisor Media, Inc., Mar. 21, 2000 [retrieved on May 2, 2001]. Retrieved from the Internet: <URL: http://www.advisor.com/Articles.nsf/AID/EDWAK041>.
David Alpher, CEFACT and ebXML: The Future of International e-Commerce? [online]. ebizQ.net [retrieved on May 2, 2001]. Retrieved from the Internet: <URL: http://www.messageq.com/communications_middleware/alpher_2.html>.
Brett McLaughlin, ebXML: Not just another acronym, JavaWorld [online]. ITworld.com, Dec. 19, 2000 [retrieved on May 2, 2001]. Retrieved from the Internet: <URL: http://www.javaworld.com/javaworld/javaone00/j-00-ebxml.html>.
ebXML Press Clippings [online]. Rachel Foerster & Associates, Ltd. [retrieved on May 2, 2001]. Retrieved from the Internet: <URL: http://www.rfa-edi.com/ebxml_press_clippings.htm>.
Amy Newman, DataChannel Joins OASIS, the UN in Support of ebXML, Internet News-Web Developer News [online]. Internet.com Corp., Dec. 2, 1999 [retrieved on May 2, 2001]. Retrieved from the Internet: <URL: http://www.internetnews.com/wd-news/article/0,,10_253221,00.html>.
Martin Bryan, Instructions for capturing ebXML Core Component definitions [online]. The SGML Centre, Jul. 6, 2000 [retrieved on

(56) References Cited

OTHER PUBLICATIONS

May 2, 2001]. Retrieved from the Internet: <URL: http://www.personal.u-net.com/~sgml/instructions.gtm>.
Rik Drummond, ebXML: The Only Change for a Worldwide Standard, E-Business Advisor [online]. Advisor Media, Inc., Apr. 2000 [retrieved on May 2, 2001]. Retrieved from the Internet: <URL: http://www.advisor.com/Articles.nsf/aid/DRUMR07>.
Open Buying on the Internet, Open Buying on the Internet (OBI) Consortium [online]. The OB! Consortium [retrieved on May 2, 2001]. Retrieved from the Internet: <URL: http://www.openbuy.org/obi/library/white-paper.html>.
Working Tracks, Open Buying on the Internet (OBI) Consortium [online]. The OBI Consortium [retrieved on May 2, 2001]. Retrieved from the Internet: <URL: http://www.openbuy.org/obi/programs/>.
Obi Library, Open Buying on the Internet (OBI) Consortium [online]. The OBI Consortium [retrieved on May 2, 2001]. Retrieved from the Internet: <URL: http://www.openbuy.org/obi/library>.
About OBI, Open Buying on the Internet (OBI) Consortium [online]. The OBI Consortium [retrieved on May 2, 2001]. Retrieved from the Internet: <URL: http://www.openbuy.org/obi/about/>.
Corporate Information,, Overview [online]. Ariba, Inc. [retrieved on May 2, 2001]. Retrieved from the Internet: <URL: http:///www.ariba.com/corporate/corporate_overview.cfm>.
Customer Service, Overview [online].Ariba, Inc. [retrieved on May 2, 2001]. Retrieved from the Internet <URL: http://www.ariba.com/customer_service/customer>.
Ariba IXB, Enteprise Business [online]. CNet Networks, Inc. [retrieved on May 2, 2001]. Retrieved from the Internet: <URL: http://www.enterprise.cnet.com/enteprise/0-9572-701-1598221.html>.
Commerce One is the e-Marketplace Company, Company Overview [online]. Commerce One, Inc. [retrieved May 2, 2001]. Retrieved from the Internet: <URL: http://www.commerceone.com/company/default.html>.
Do Business with Anyone, Anytime, Anywhere, Solutions Overview [online]. Commerce One, Inc. [retrieved on May 2, 2001]. Retrieved from the Internet: <URL: http://www.commerceone.com/solutions/>.
Harness the Power of e-Business, Services Overview [online]. Commerce One, Inc. [retrieved on May 2, 2001]. Retrieved from the Internet: <URL:http://www.commerceone.com/services/>.
Commerce One.Net, The Premier Business-to-Business e-Marketplace [online]. Commerce One, Inc. [retrieved on May 2, 2001]. Retrieved from the Internet: <URL: http://www.marketsite.com>.
Bloomberg News, Ariba, Commerce One shares hit on analyst comment , Tech News, Nov. 27, 2000 [online]. CNET Networks, Inc. [retrieved from the Internet: <URL: http://news.cnet.com/news/0-1007-200-3878450.html?tag=st.ne.ron.lthd>.
About e-business [online]. IBM [retrieved on May 2, 2001]. Retrieved from the Internet: <URL: http://www-3.ibm.com/e-business/overview/>.
IBM e-business, About e-business [online]. IBM [retrieved on May 2, 2001]. Retrieved from the Internet: <URL: http://www-3.ibm.com/e-business/overview/28212.html>.
e-commerce, About e-business [online]. IBM [retrieved on May 2, 2001] Retrieved from the Internet: <URL: http://www-3.ibm.com/e-business/overview/28210.html>.
WebSphere software platform [online]. IBM [retrieved on May 2, 2001]. Retrieved from the Internet: <URL: http://www-4.ibm.com/cgi-bin/software/track3.cgi?file=/software/info/websphere/index.html&S_TACT=100AWW10&S_CMP-campaign>.
Application Development, Software, Products & Services [online]. IBM [retrieved on May 2, 2001]. Retrieved from the Internet: <URL: http://www.-4.ibm.com/software/ad/>.
ibm.com, Software, Products & Services [online]. IBM [retrieved on May 2, 2001]. Retrieved from the Internet: <URL: http://www.-4.ibm.com/software/>.

mySAP E-Commerce™, SAP E-Business Solutions [e-Commerce] [online], [retrieved on May 4, 2001]. Retrieved from the Internet: <URL: http://www.sap.com/solutions/e-commerce/e-commerce_over.htm>.
my SAP™ Technology, my SAP.com Solutions [online], [retrieved on May 4, 2001]. Retrieved from the Internet <URL: http://www.sap.com/solutions/technology/technology_over.htm>.
mySAP™ Services, my SAP .com Solutions [online], [retrieved on May 4, 2001] Retrieved from the Internet: http://www.sap.com/services/services_over.htm>.
mySAP.com™-Solutions for the New New Economy, my SAP.com Solutions [online], [retrieved on May 4, 2001]. Retrieved from the Internet <URL: http://www.sap.com/solutions/solutions_over.htm>.
mySAP™ Education, mySAP.com Solutions [online], [retrieved on May 4, 2001]. Retrieved from the Internet: <URL: http://www.sap.com/education_over.htm>.
Collaborative Commerce for Direct Materials, e-STEEL Corporation 1998-2001 [retrieved on May 11, 2001]. Retrieved from the Internet: <URL: http://www.esteel.com>.
e-STEEL Launches Strategic New Exchange Feature: Mass Negotiation, e-STEEL Press Releases, Apr. 2, 2001 [online], e-STEEL Corporation [retrieved on May 11, 2001]. Retrieved from the Internet: <URL: http://www.esteel.com/news/pressroom/pressreleases/2001/apr/pressreleases040201.shtml>.
Solutions, e-STEEL [online], e-STEEL Corporation [retrieved on May 11, 2001]. Retrieved from the Internet: <URL: http://www.esteel.com/solutions.shtml>.
Private Marketplace, e-STEEL [online], e-STEEL Corporation [retrieved on May 11, 2001]. Retrieved from the Internet: <URL: http://www.esteel.com/privatemarketplace.shtml>.
Collaboration Management System, e-STEEL [online], e-STEEL Corporation [retrieved on May 11, 2001]. Retrieved from the Internet: >URL: http://www.esteel.com/cms.shtml>.
Web Hosting, e-STEEL [online], e-STEEL Corporation [retrieved on May 11, 2001]. Retrieved from the Internet: <URL: http://www.esteel.com/webhosting.shtml>.
Trilogy: Products [online], Trilogy Software, Inc. [retrieved on May 14, 2001]. Retrieved from the Internet: <URL: http://www.trilogy.com/sections/products/>.
Products: MCC Order Server [online], Trilogy Software, Inc. [retrieved on Jun. 1, 2001]. Retrieved from the Internet: <URL: http://www.trilogy.com/Sections/Products/mcc_products/OrderServer.asp>.
The Triology Fast Cycle Time™ Methodology [online], Trilogy Software, Inc. [retrieved on May 14, 2001]. Retrieved from the Internet: <URL: http://www.trilogy.com/sections/insight/fct.asp>.
"Notice from the European Patent Office Dated Oct. 1, 2007 Concerning Business Methods", Official Journal EPO.
Notice of Allowance (Mail Date Mar. 12, 2012) for U.S. Appl. No. 12/498,578, filed Jul. 7, 2009.
Fletcher-McDonald, Trina; The buying connection; InfoWorld vol. 21, No. 29; Jul. 19, 1999; 13 pages.
Office Action (Mail Date Jan. 30, 2012) for U.S. Appl. No. 12/498,578, filed Jul. 7, 2009.
Excerpt from U.S. Appl. No. 60/183,067, filed Feb. 16, 2000; 2 pages.
Information Materials for IDS; JP counterpart; dated Nov. 16, 2010.
Steinke, Steve; In Search of Integrated Management; Dec. 1, 1998, Newtork, PNA. ISSN: 1093-8001.
Fletcher-MacDonald, Trina; Test Center Comparison, InfoWorld, Jul. 19, 1999, v 21, n 29. 15 pages.
Murphy, Ph.D., Diane R.; The Exciting Role of the Credit Manager in the Expanding Commerce Marketplace; Business Credit; Oct. 2000; 102, 9; ProQuest Central; pp. 64-73.
Webster, John; An Alphabet Soup of B2B Standards—SOAP, ebXML, UDDI and others will slowly gain momentum in 2001; InternetWeek, Dec 18, 2000; 6 pages.
Demers, Marie Eve; Viacore to Link Microsoft—Company Business and Marketing—Brief Article; Electronic News, Jan. 8, 2001. 2 pages.
Trommer, Diane; Viacore Translates RosettaNet, Electronic News, Aug. 7, 2000, pp. 1-3.

(56) References Cited

OTHER PUBLICATIONS

BEA Systems; BEA WebLogic Process Integrator supports work flow of E-business processes; Nov. 6, 2000. 3 pages.
Yendluri, Prasad; RosettaNet Implementation Framework; 2000 webMethods, Inc., Feb. 2000, 10 pages.
Office Action (Mail Date Jun. 1, 2005) for U.S. Appl. No. 09/757,771, filed Jan. 9, 2001.
Final Office Action (Mail Date May 17, 2006) for U.S. Appl. No. 09/757,771, filed Jan. 9, 2001.
Office Action (Mail Date Dec. 28, 2006) for U.S. Appl. No. 09/757,771, filed Jan. 9, 2001.
Office Action (Mail Date Jun. 7, 2007) for U.S. Appl. No. 09/757,771, filed Jan. 9, 2001.
Final Office Action (Mail Date Nov. 28, 2007) for U.S. Appl. No. 09/757,771, filed Jan. 9, 2001.
Office Action (Mail Date Apr. 23, 2008) for U.S. Appl. No. 09/757,771, filed Jan. 9, 2001.
Notice of Allowance (Mail Date Mar. 6, 2009) for U.S. Appl. No. 09/757,771, filed Jan. 9, 2001.

* cited by examiner

SYSTEM AND METHOD FOR WORKFLOW ENABLED LINK ACTIVATION

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

FIELD OF THE INVENTION

This invention relates to the field of computer software. More specifically, the invention relates to a method and system for enabling business entities to prepare an electronic link for conducting electronic business-to-business trade transactions.

BACKGROUND

Conducting electronic trade with business partners is a complex task that requires multiple levels of control and several stages of interaction to complete a transaction. For example, a manufacturer of electronic systems (e.g. computers) procures electronic components and pre-assembled electronic devices from a plurality of vendors. The manufacturer establishes a trade link with each partner, typically, based on contract guidelines, industry specifications and standards that allow the manufacturer to be supplied with the components in timely fashion and with the least amount of errors.

The process of establishing a link between trading partners is complex. Before starting to place procurement orders, business entities need to check a plurality of business requirements. For example, the business entities have to establish the proper routes of orders, check the business rules on each side of the trade, and check the legal requirements for the trade. Furthermore, a number of rules have to be checked with regard to order and supply handling. For example, exchanging order confirmations, tracking orders, verifying the validity of the content of the orders, processing modifications to orders are all aspects of the business transaction that must be put in place and checked before going to production and making a partner link usable for trading.

Establishing a trade link between business partners has traditionally been conducted manually using personal communication and paper forms. This typically involves writing up the list of requirements and preparing forms for each step of the process of establishing the trade link. The forms are examined, signed and exchanged for the next set of forms. This manual process is not only slow but since it requires involvement of multiple persons; it is error prone and presents multiple breaking points at several levels. Different persons involved in the process may be geographically separated e.g. belong to separate business departments, and the personal communication may not be streamlined to coordinate processing.

Some protocols, such as the ones developed by Rosettanet™, are used to enable computer networks to electronically conduct trade in a streamlined fashion. However, the activation stage for establishing the link with trading partners still relies on the manual process.

Therefore, there is a need for a computer-based system and methods for enabling trading partners to streamline and control the process of activating a link between trading partners.

SUMMARY OF THE INVENTION

Embodiments of the invention provide a method and system for network-based workflow enabled project management that allows trade links to be established between a business entity and one or more trading partners through a trade gateway. To establish a trade link interfacing to a trade gateway, the business entity and the trading partners have to fulfill several requirements some of which are procedural (e.g. legal and/or accounting rules for conducting trade transactions) and others are logistical (e.g. setting up computer networks and providing software compatibility). Embodiments of the invention provide support to fulfill both procedural and logistical requirements. Embodiments of the invention may be implemented as a multi-phase process, where each phase is comprised of one or more process steps. A system embodying the invention, for example, allows for implementing process plans, managing workflow, generating alerts, tracking progress for each individual process in accordance with a schedule, and generating real-time reports.

The activation process involves defining the trade steps to conduct electronic trade in accordance with one or more selected trade protocols. For example, the business entity may define a set of partner interface processes (PIPs) in accordance with Rosettanet™. The partner interface processes may be structured in sequences (workflow) of processes due to an inherent inter-dependence or in accordance with the project plan the business elects to implement.

In a first phase, the assessment planning phase, a business entity gathers information about the participants' logistics such as the software platform for conducting trade, the software version, the trade protocol type and version, and any other information that may define each participant's technology and technological readiness. A system embodying the invention enables the business entity to enter participant's information and the project's information (e.g. protocol information) and implement security features to allow participants to use the system remotely. The business entity develops an integration plan suited for each participant based on the participant's information.

Embodiments of the invention implement business procedures suitable for electronic use and provide tools that allow the business entity to easily define the requirements and enter the participants' data. A representative of the business entity (e.g. a community manager) may remotely connect to the system using a client application, and build virtual groups of users, representing communities of trade participants, and enter participant's information used to control the participant's behavior when the latter interacts with the system. The system allows participants to log on to the system, register and enter information, allowing the system to make an assessment about the readiness of the participant.

The readiness assessment phase is one in which the system (or a person) checks that the requirements to start testing the logistics of the links are fulfilled.

The implementation phase may begin after determining the readiness of a participant. In this phase, the community manager selects among a set of electronic processes that are fit to carry out trade transactions with that participant. For example, the community manager selects the electronic processes that are relevant with regard to the software platform and the protocol used by the participant's system.

The testing phase addresses the detailed aspect of each step of the trade. Each step may be defined as an action which a system undertakes, followed by a response action which the remote system should undertake. In the latter case, the system undergoes a check to ensure that it is capable of handling actions, exceptions to actions, response actions and any other aspect of a trade step required to conduct a trade transaction.

Furthermore, the system keeps track of the testing in accordance with a schedule, reports testing results, and provides alerts with regard to the progress status of the testing of each individual process.

A typical transaction to be tested may involve placing orders, checking product information against a set of specifications, accessing inventory information and enabling any other electronic transaction related to procurement.

The migration phase comprises ensuring that the partners are still ready to interoperate after the testing phase has verified that the system is capable of handling the trade transactions and throughput. The processes are then migrated to production for use to carry out actual trade transactions.

DETAILED DESCRIPTION

Figure 1:
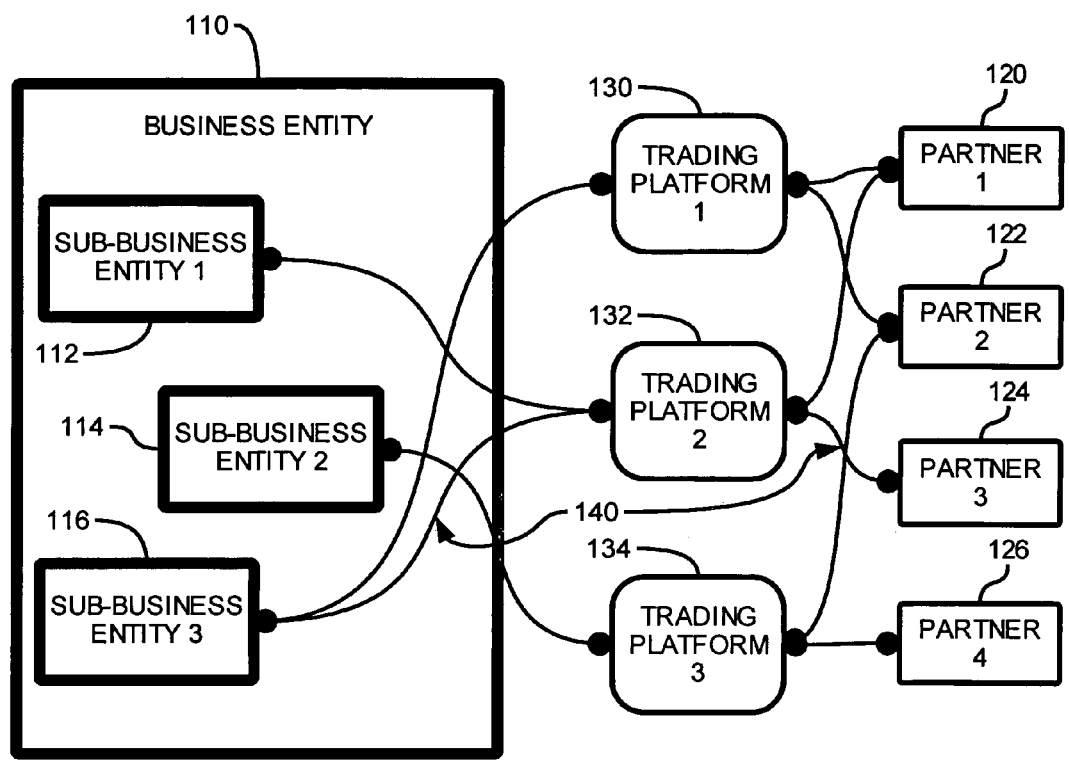
FIG. 1 is a block diagram that illustrates the environment in which embodiments of the invention are implemented to facilitate activation of trade processes.

Embodiments of the invention provide a method and system for network-based workflow enabled project management that allows trade links to be established between a business entity and one or more trading partners through a trade gateway. Embodiments of the invention facilitate, through the use of computer network based interfaces, the stages of assessment planning and assessing the readiness of partners, implementing the trade gateways, testing the gateways and migrating the gateways to production via a workflow engine capable of executing on a scalable architecture.

In the following description, numerous specific details are set forth to provide a more thorough description of the invention. It will be apparent, however, to one skilled in the art, that the present invention may be practiced without these specific details. In other instances, well known features have not been described in detail so as not to obscure the present invention. The claims, however, are what define the metes and bounds of the invention.

Terminology

The term "activation" is used herein to refer to the process of preparing an electronic communication gateway to conduct electronic trade such as for procuring items of manufacture or services between two or more parties.

The phrase "trade gateway" and the term "gateway" are interchangeably used herein to refer to the electronic link used to carry out trade transactions.

The phrase "Community manager" is used herein to refer to a representative of a business entity whose role comprises managing partners' information, building and maintaining lists (communities) of partners and/or participants, the requirements each participant has to fulfill to become a partner and overseeing the process of activating trade gateways using embodiments of the invention.

The phrase "participant" is used herein to refer to a party involved in the activation process using embodiments of the invention. A participant may, however, already be a partner with whom the business entity is to start a new gateway or update an existing gateway.

Any reference to a "user" herein alternately refers to a person using a computer application and/or to one or more automatic processes. The automatic processes may be any computer program executing locally or remotely, and enabled to communicate with embodiments of the invention, and that may be triggered following any predetermined event.

The phrase "client" is used herein without distinction to whether it is a user's application, a client machine or another server.

Embodiments of the invention described herein are set forth in terms of method steps and systems implementing the method steps. It will be apparent, however, to one with ordinary skill in the art that the invention may be implemented as computer software i.e., a computer program code capable of being stored in the memory of a digital computer and executed on a microprocessor, or as a hardware i.e., circuit board based implementation.

Embodiments of the invention may be implemented as a computer program based on a highly modularized architecture. Each component may be implemented as a part of large software infrastructure (e.g. an Enterprise JavaBean within an Application Server such Websphere™ from IBM, or a Net component) or as a plug-in or applet that may be embedded within, or interfaced with third party applications. Embodiments of the invention may utilize scalable architectures comprising clusters with failover capabilities or may be implemented on less capable architectures depending upon the requirements of the gateway.

Overview

FIG. 1 is a block diagram that illustrates the environment in which embodiments of the invention are implemented to facilitate activation of trade processes. A business entity shown as block 110 may represent any company or a group thereof that may have several sub-divisions such as company departments or branches as represented by blocks 112, 114 and 116. An example of a business entity would be a computer manufacturer that may procure computer components and pre-assembled devices from multiple vendors. The business entity may have multiple manufacturing facilities located in several geographical areas within a single country or in different countries.

The business entity 110 may have one or more trading partnerships with other business entities which are represented in FIG. 1 by blocks 120, 122, 124 and 126. Each of the partners may supply the business entity, or any number of sub-entities, with one or more items of manufacture or service.

To conduct electronic trading, the business entity 110 or a sub-entity establish trading gateways (e.g. 140) with partners using a network of computers and software applications specifically designed to conduct the trade transactions. The business entity 110 and/or the sub-entities 112, 114 and 116 may utilize one or more trading platforms designed to conduct business transactions with partners 120, 122, 124 and 126. In the illustration of FIG. 1, partner 120 may be a supplier to sub-business entities 112 and 116 and utilize platform 130 and 132 to conduct the trading transactions.

The platforms 130, 132 and 134 of FIG. 1 represent the set of protocols and networks partners use to conduct trading transactions. An example, of an infrastructure protocol is Rosettanet. In addition to the type of protocols, the partners and the business entity (or sub-entities) may use one or more computer software products to execute transactions.

In a typical setting, partners agree on the trading platform and data transfer protocols to establish a gateway. For example, partner 122 may establish one gateway with sub-entity 114 and another gateway with sub-entity 116 using platform 134 and 130, respectively. Trading partners may have a variety of gateways e.g., IBM WebSphere Business Integration Connect™ product, Microsoft™ Biztalk product or TIBCO™ product, in a heterogeneous environment. Each of the latter technologies may run one or more protocols for exchanging business-to-business messages or may comprise automated processes between each business entity and the client or partner on the other side of the gateway.

The process of setting up a gateway demands interfacing the technology infrastructure of each side. In existing practice, the activation of a trading gateway is tackled manually though the use of paper forms, and manual procedures for testing connectivity.

Phases of Activation

Figure 2:
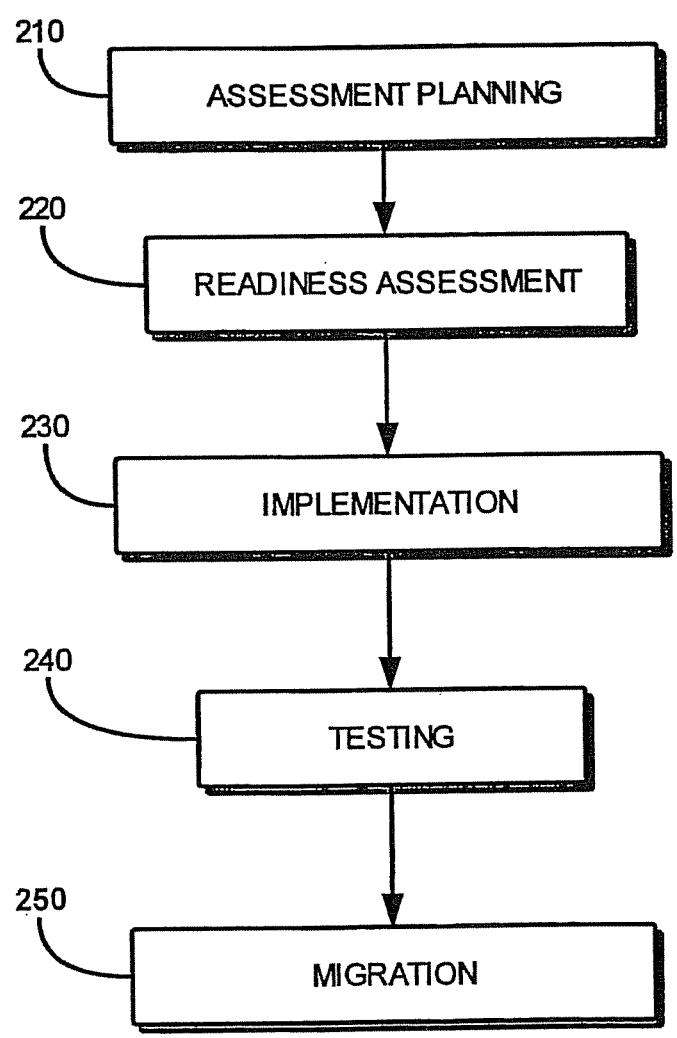
FIG. 2 is a flowchart diagram illustrating overall phases involved in implementing a gateway activation process in accordance with embodiments of the invention.

FIG. 2 is a flowchart diagram illustrating overall phases involved in implementing a gateway activation process in accordance with embodiments of the invention. Assessment planning phase 210 refers to assessment planning of gateway activation. During assessment planning phase 210, the business entity assembles the requirements for the activation. "Requirements" refers to the set tasks and rules the participant in a trade relationship should fulfill before a trade gateway may established. Examples of such requirements comprise legal requirements such as whether a participant is properly licensed in a given state (or country) to sell a given product. Requirements may also concern technical aspects of the participant's qualification to meet industry standards with regard to the manufacturing items it carries. The business entity gathers information about the participants' logistics such as the software platform for conducting trade, the software version, the trade protocol type and version, and any other information that may define each participant's technology and technological readiness.

Assessment planning phase 210 may also comprise the process of building participants groups and sub-groups or communities. The community manager may build communities to facilitate management of large numbers of participants. A group of participants forming a community is put in a list associated with one or more categories. In the latter case, each community may be associated with one or more profiles. A profile may comprise any type of attribute information to facilitate the setup process. For example, participants may be grouped by the type of protocol, software platform, location or any other attribute which may be associated with all elements of a particular community.

In assessment planning phase 210, the community manager may also build one or more questionnaires that are submitted to individual participants to fulfill a given requirement. For example, the community manager may prepare a list of agreements, and disclosures which the participant has to review and on which the participant has to agree as a requirement to continue on to the rest of the activation steps.

Embodiments of the invention may require that some fields in a questionnaire are required and that some fields are not required, or that may be deferred until a later point in the workflow.

Participants are provided with a plurality of questions about the infrastructure used on the participant's side (e.g. software version, availability of resources and any other information that helps establish a list of requirements for configuring a gateway).

Readiness assessment phase 220 refers to the assessment of the activation process, which is comprised of steps wherein the business entity builds, reviews and generate reports on the progress of the activation process. In addition a participant may be notified to utilize an embodiment of the invention to complete its side of the requirements to proceed with any remaining steps of readiness assessment phase 220.

Implementation phase 230 is the phase in which the activation process is configured for conducting trade transactions with specific protocols and communications layers. After determining the readiness of a participant, the community manager selects among a set of electronic protocols, products and processes that are capable of carrying out trade transactions with that participant. For example, the community manager may set the configuration parameters, communications standards, application network protocols and electronic processes that are relevant with regard to the software platform and the protocol used by the participant's system. For a given communications protocol, it is possible that other sub protocols are automatically selected and are therefore automatically set as part of the workflow for implementation phase 230.

Testing phase 240 comprises conducting trade transactions using the electronic processes put in place during the implementation phase. Testing may cover all interfaces to the gateway including exception handling interfaces. The implementation components as business processes are typically comprised of several steps, some of which may not complete properly and must be accounted for. For example, the trading system of the business entity may place an order, as a first action, and the receiving system (trading partner's system) may be required to issue an acknowledgment or exception which the sending system should be capable of receiving back and verifying the information provided back by the partner's system. In embodiments of the invention, systems are tested for handling specific processing categories including, for example, volume, choreography, security and connectivity, negative/exception, large files and any other processing types requiring testing.

In an embodiment of the invention, volume testing checks to ensure that the partner can provide and generate the peak production volume that the hub expects to be exchanging with the partner's system, and also verifies that the hub is able to generate and accept the peak volume.

Choreography testing ensures that the partner's system and the business entity's system are capable of analyzing and validating all exchanged messages in accordance with one or more trade protocols. For example using Rosettanet™ protocol, the systems are ensured to be able to handle partner interface processes (PIP) as asynchronous single- or double-action activity (e.g. 3B2 or 3A4). In the latter, every time a system sends out a document (in Rosettanet), an acknowledgment is sent back. Choreography testing ensures that the systems are capable of generating one or more messages in accordance with one or more trade protocols, handling received messages and processing messages in the context of the sequence in which the messages are received. For instance, the receipt in Rosettanet can be more complicated than just an acknowledgment or receipt; it may require a specific response, which depends on the nature of the process and the amount of elapsed time.

Security and Connectivity testing ensures that the business entity and partners communicate in a secure manner. Embodiments of the invention may implement one or more computer programs to encrypt data and securely authenticate users as they log on to the system. Furthermore, the system is enabled to grant access to each user at a given level based on the set of privileges the user is assigned. Embodiments of the invention enable a security manager to create and manage security access levels.

Negative Testing ensures that the system is able to process external exceptions as in the case of receiving an action that requires the system to carry out a given task which should be turned down. For example, using Rosettanet, the system should be capable of generating a cancellation message. Negative Testing ensures that the system is able to generate a cancellation message in accordance with the protocol used. Another negative test involves data validation. In the latter case, the test ensures that the system is capable of generating a rejection message (or action) when data can not be validated.

Large Files testing is similar to the volume and ensures that both the partner and the Hub can send and receive the largest file possible expected to be used during production.

In embodiments of the invention the set of tests may comprise testing for every aspect of the procedures and process steps designed to take place at production time.

Testing phase 240 precedes the migration phase 250. Migration comprises ensuring that the partners are still operationally ready, i.e., that connectivity can be established and that the gateway is capable of handling the trade transactions from the business entity and the partner involved. The processing components and/or software processes are then migrated to production machines and/or network addresses for use in carrying out trade transactions.

Activation Implementation and User Interface

Figure 3:
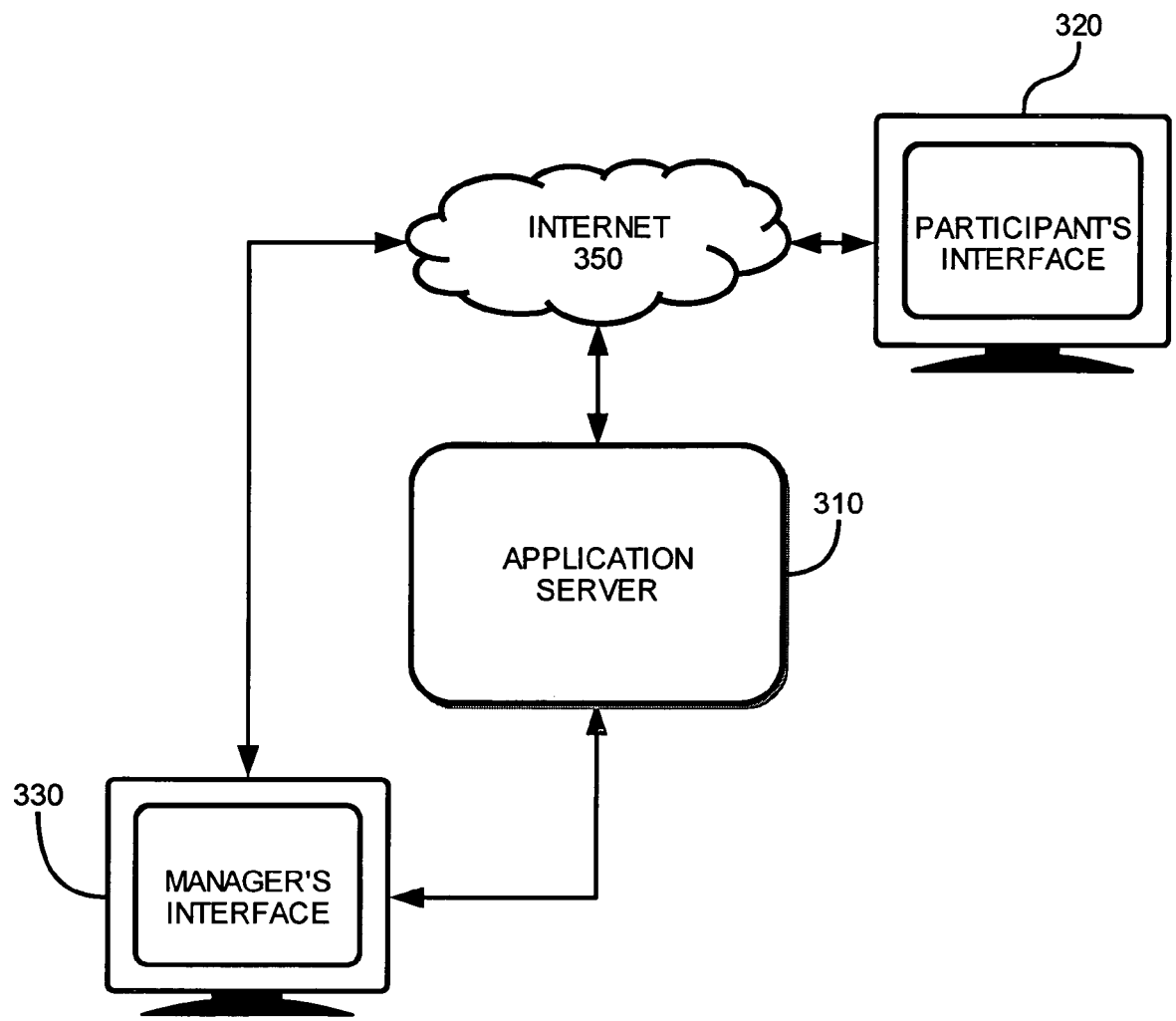
FIG. 3 is a block diagram that illustrates a context in which embodiments of the invention are implemented and utilized.

FIG. 3 is a block diagram that illustrates a context in which embodiments of the invention may be implemented and utilized. A first software program may reside on an application server (e.g. 310); this may include a workflow engine and various software components that represent data and or interfaces used in the gateway. The server hosting the application server software may also comprise an N-tier architecture having a web server with a servlets engine, a database and various connector components for interfacing to different types of protocols. One or more client applications may reside on other systems such as a partner's system (e.g. block 320) and a manager with the business entity (e.g. 330). The client software applications may connect with the server application and allow communication with the latter, through an internal network for example. The client applications may also connect to the server application using a wide area network such as the Internet e.g. 350. In an embodiment of the invention, the server application is capable of generating documents in accordance with one or more data formats compatible with any application used to browse the Internet. For example, the application may generate hyper-text markup language (HTML) documents, extensible markup language (XML) documents or any other data format capable of communicating with a web browser. In other instances, an embodiment of the invention is capable of delivering applets to run within a web browser via a java plugin for example, on the client's computer.

In a typical setting, a community manager uses client application 330 to setup the communities of participants with which, the business entity plans to carry out electronic trading. A representative of each one of the participants then logs onto the application server using a client program 320 (e.g. a web browser). Embodiments of the invention allow the community manager to input the initial data, control the flow of the multiple steps to be performed and generate reports about the status of the activations process through a workflow engine hosted on the application server for example.

Figure 4:
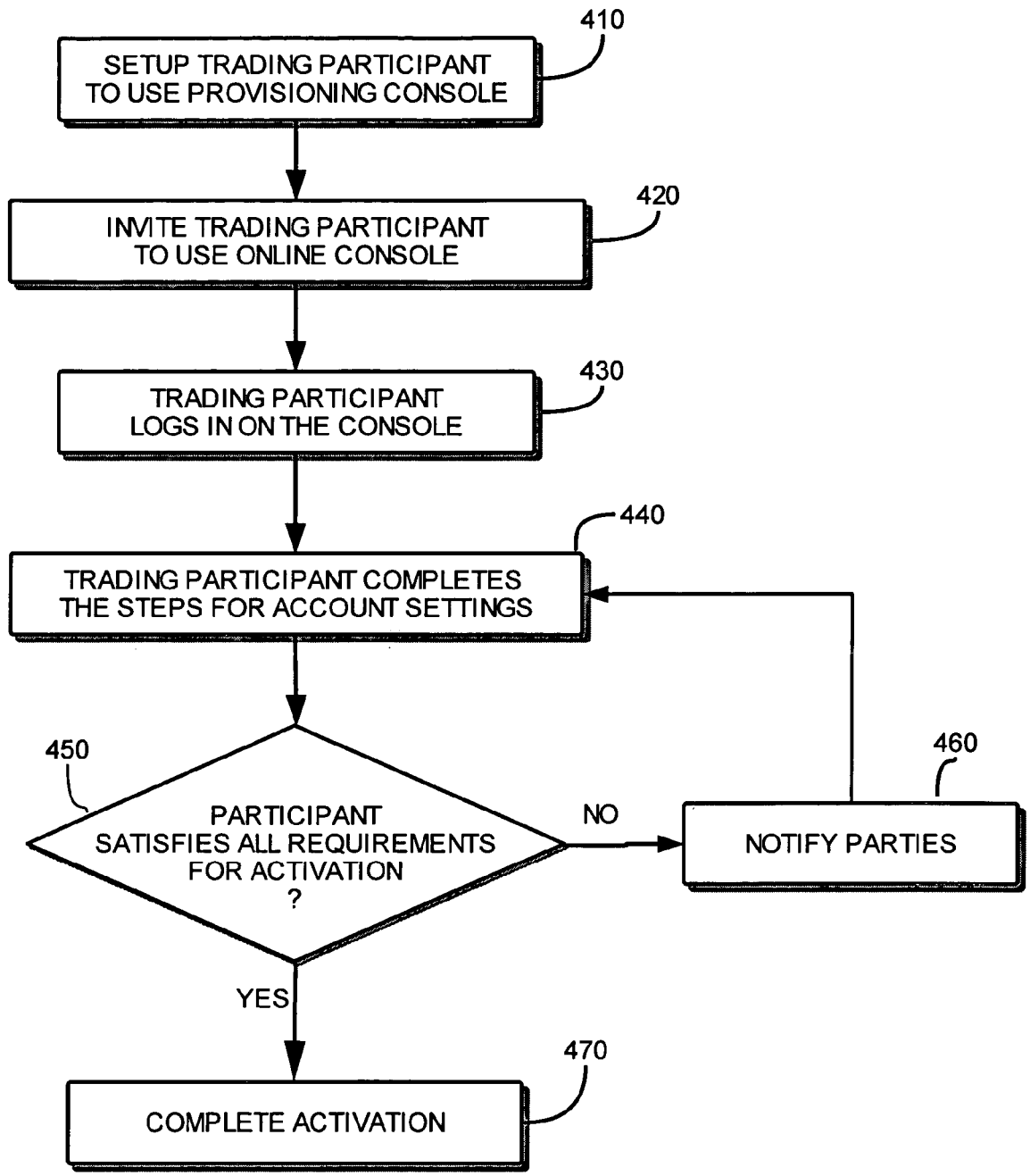
FIG. 4 is a flowchart illustrating steps involved in the activation process as implemented in accordance with embodiments of the invention.

FIG. 4 is a flowchart illustrating steps involved in the activation process as implemented in accordance with embodiments of the invention. At step 410, the community manager logs on to the system and sets up the communities of trading participants. Step 410 may involve forming sets of tasks which one or more participants have to fulfill to be become a trading partner as part of the activation workflow. For example, the community manager may construct one or more forms the participant has to fill out, or one or more questionnaires the participant has to answer at a later time. Embodiments of the invention are enabled to present the forms and questionnaires to the partners and collect their input using any of the client applications described above. The system is also enabled to track user's activity and generate a status and/or progress report throughout the activations process.

At step 420, the participants are notified of the readiness of the system to start a new activation process. The system is enabled to generate notification, for example, using electronic mail or any other means for communication. However, step 420 may be conducted using personal means such telephone calls including computer-initiated calls with touch tone acknowledgement feedback to control the workflow of the activation process.

At step 430, the trading participant logs on to the console provided by embodiments of the invention. Embodiments of the invention may allow participants to self-register. Self-registration enables participants to join the community of partners. Self-registration may be provided as a web-based form that participants fill out. Following confirmation an account may be created within the system.

At step 430, the system submits the requirement forms to capture the data the participant is requested to provide in order to proceed with the activation process. The above-mentioned questionnaires, as well as information the business entity needs in order to complete the establishing of a trade channel are presented to the participant. The system provides a plurality of user interfaces to enable the participant to enter data, view status reports and have access to help information. The participant may also complete the process in multiple sessions. Embodiments of the invention are capable of tracking status information, and allow the participant to resume data entry at delayed times. Furthermore, the system allows multiple users (e.g. representatives of the participant's business) to access the system simultaneously and view the status and/or proceed with data entry to continue forward or correct data for the activation process.

At step 440, the participant completes the data entry. For example, the latter step may also combine personal interaction that involves a validation and completion part carried out by the community manager.

At step 450, the system carries out a validation process to check whether a participant has fulfilled the requirements for activation. If all the procedures have been addressed, the system may proceed to complete the activation at step 470. If the participant has not completed the activation requirements, the system may generate alerts or status reports and notification at step 460. The participant is able to return to the console and proceed with entering information necessary for the activation.

Figure 5:
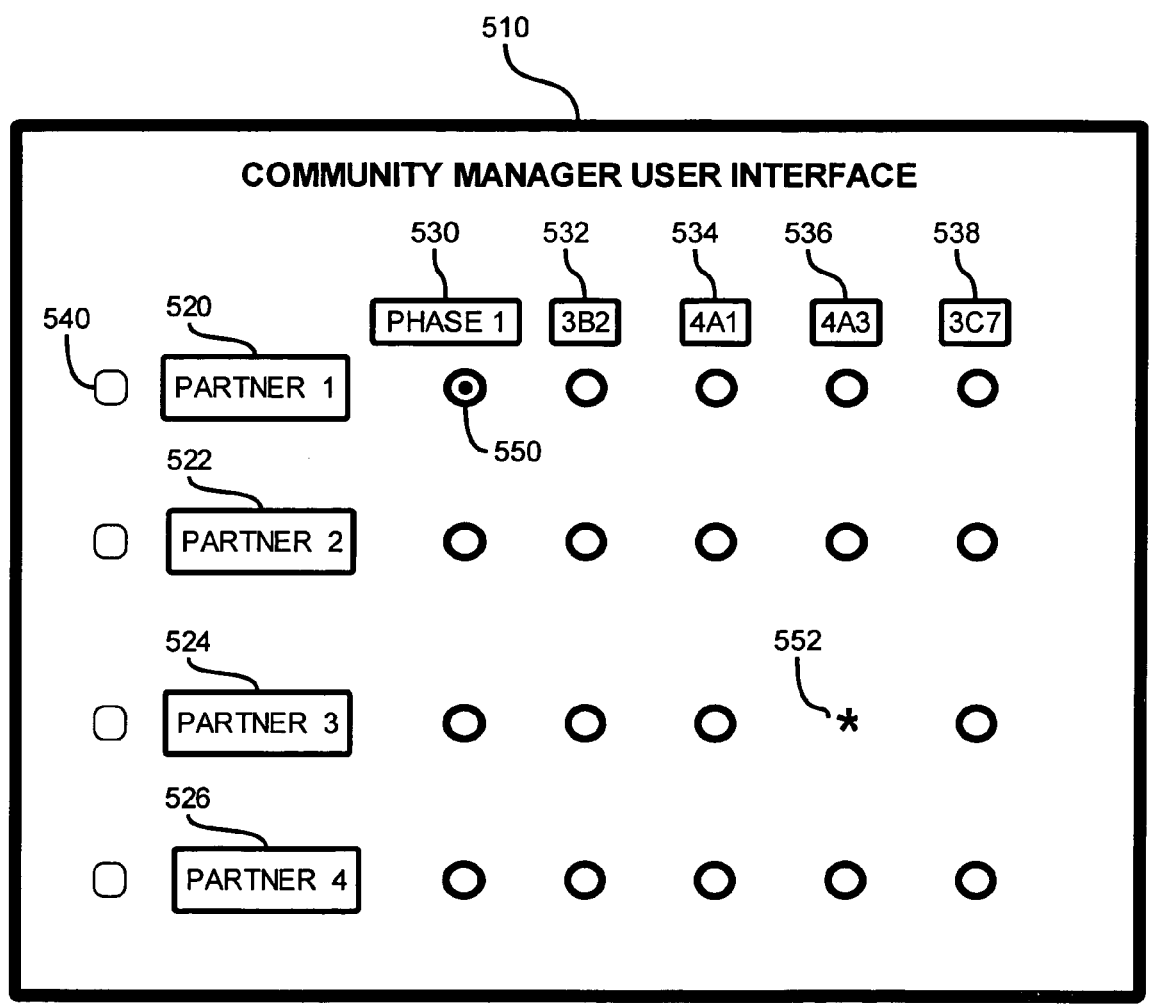
FIG. 5 is a block diagram depicting graphical components of a user interface that enable a community manager to enter, view and alter information in accordance with embodiments of the invention.

FIG. 5 is a block diagram depicting graphical components of a user interface that enable a community manager to enter, view and alter information in accordance with embodiments of the invention. Block 510 represents a panel on the community manager interface through which the community manager is able to enter data, view status of progress in the activation process and alter the information. Panel 510 may present a list of partners (e.g. blocks 520, 522, 524 and 526) each of which designates a participant involved in an activation process. Panel 510 presents one or more processes (e.g. 530, 532, 534, 536 and 538) community manager intends to implement for the community of partners. For instance, in the project illustrated in FIG. 5 comprises a set of Rosettanet partner interface processes (PIP) 3B2, 4A1, 4A3 and 3C7. Each participant receives a set of associations with one or more PIPs. An association between a partner and a PIP designates whether the participant is required to complete the activation for that particular PIP.

Panel 510 of the user interface utilizes a set of graphical widgets to easily provide status information to the user. For example, a widget such as icon 540 may indicate whether a given participant is involved in this particular project. Other icons such 550 may indicate that a given phase (e.g. block 530) has been completed by a given partner (e.g. 520), or icon 552 may indicate that there is a specific issue with a particular PIP (e.g. block 536) associated with a given participant (e.g. block 524). The icons may also utilize color coding to indicate one or more phases or states at which a partner is in the activation process. For example, yellow may indicate that there is a warning and green may indicate that no warning was raised for a particular PIP.

Embodiments of the invention allow a community manager to manually alter the state of an association between a participant and a particular step of the process. For example, when a matter is addressed manually or in person, the manager may indicate to the system that a given task has been implemented. In other embodiments of the invention, the system may automatically determine the visualization for the association based on the state of completion of the PIP in relation to the participant. The manual features of embodiments of the invention allow for overriding the system's automatic processes and workflow, and for correcting errors made either by the system or a user.

Figure 6:
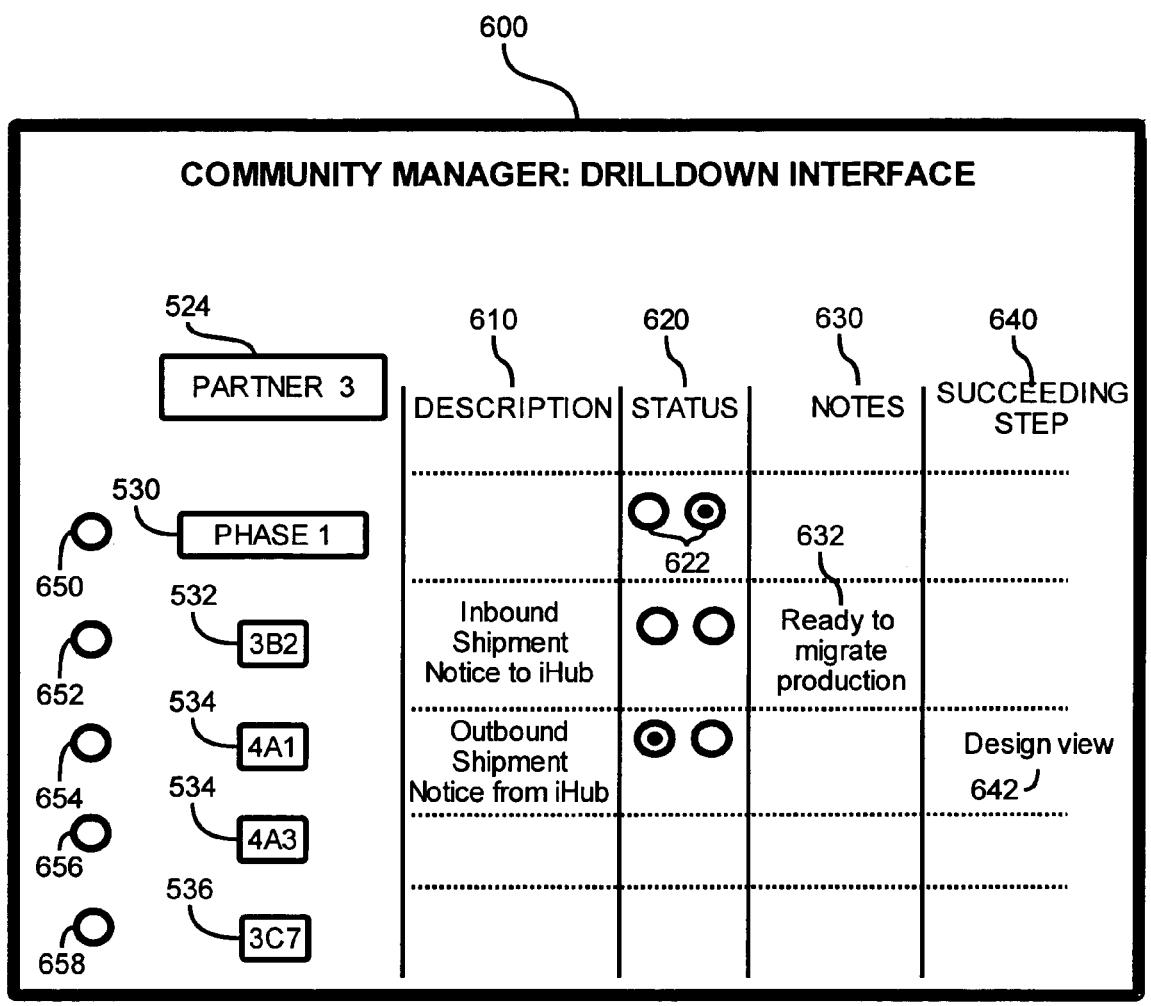
FIG. 6 is a block diagram depicting graphical components of a user interface that enables a community manager to drilldown participant's information in accordance with embodiments of the invention.

FIG. 6 is a block diagram depicting graphical components of a user interface that enables a community manager to drilldown participant's information in accordance with embodiments of the invention. Panel 600 shows one or more components representing a participant (e.g. partner 524), and the processes (e.g. 530, 532, 534 and 536) associated with the selected participant. Embodiments of the invention may implement a graphical component for every data item regarding the participant such as the processes associated with the participant, the properties of the association (e.g. PIP name/number) and the progress status of the activation process. For example, graphical widgets 650, 652, 654, 656 and 658 are each associated with a PIP and indicate the completion status of the PIP. Embodiments of the invention may utilize color-codes or a set of shapes to provide information about the PIP. The user interface also provides detailed information about each process associated with the participant. Panel 600 contains a description area 610 where a user enters text description. The system may also automatically generate the description text from a database of descriptions using the progress status information. The system indicates the progress status of each of the steps using iconic representation such as icons 622. In this example as in other ones, the system enables the user to directly alter the information in the graphical interface (e.g. by checking a radio button), which is translated into an alteration of the underlying data.

The user interface has one or more fields to hold data that is not necessarily required for the activation process. For example, field 630 depicts a field used for informational purposes by entering user's notes (e.g. 632). Field 630 may be made uniquely associated with specific actions. Furthermore, the system possesses automatic capabilities to populate field 630 so as to provide human-readable messages about the state of the progress.

The system also tracks the workflow of processes and the sequence in which they may succeed one another. Field 640 may indicate the next step to be carried out in the process of the activation following each step. For example, description (or reference) 642 may indicate one or more steps to follow step 534. A unique description, identification, reference, or any combination thereof may be used to identify the next step to be taken either by the community manager, the participant or both.

As previously described, embodiments of the invention utilize of icons (e.g. 650, 652, 654, 656 and 658) to provide important information about each step in the activation process.

Figure 7A:
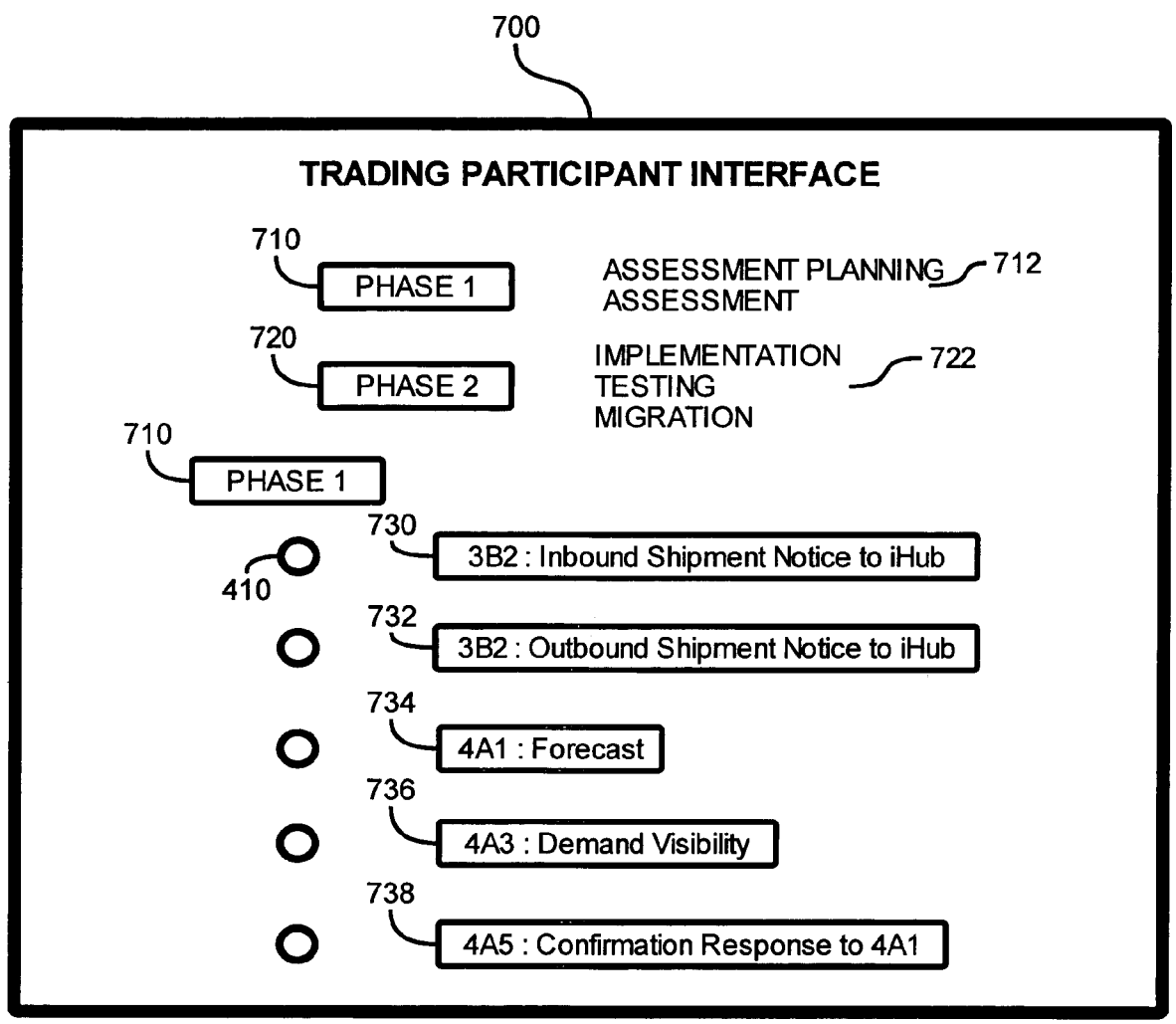
FIGS. 7A and 7B are block diagrams depicting graphical components of a user interface that enables a participant to access and enter data in accordance with embodiments of the invention.
Figure 7B:
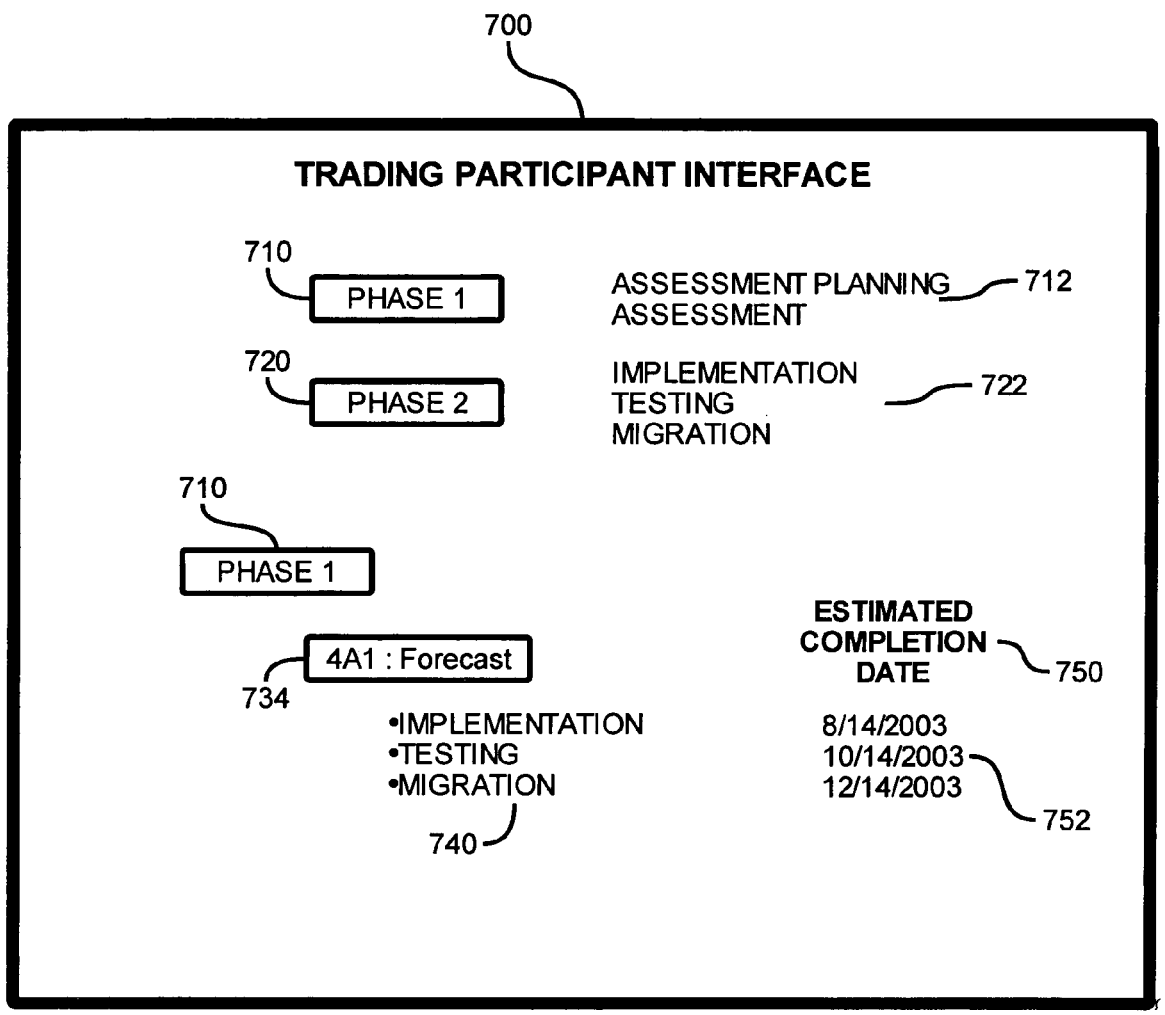

FIGS. 7A and 7B are block diagrams depicting graphical components of a user interface that enables a participant to access and enter data in accordance with embodiments of the invention. As described above, the participant receives notice that the system is ready to initiate the electronic communication phase with the participant. The notification may be carried out electronically (e.g. through an electronic message) or in person. At notification time, the participant also receives the login information. In one embodiment of the invention, the login information is a user name and password which allow the system to authenticate and grant the participant access to communicate with embodiments of the invention. However, login data may be of any other type such as an encryption key, or any other type of information allowing the system to identify a participant. The system may also use the login information to also determine user access level. User access level defines the privileges that participant receives for view and/or modifying data. The latter is important for building hierarchies, which allows a business partner to have multiple persons to be involved in an activation process while keeping control over who may alter or view specific data. By using privilege hierarchies, the system prevents users from over-stepping each other's work and therefore preventing errors.

In addition, the system allows for self-registration. The latter is a process of capturing information about the participant and allowing the latter to become part of a community of trade partners. The steps for conducting self registration may utilize one or more forms (e.g. HTML forms) to allow the participant to enter the data through a client application and transmit it to the system.

Panel 700 shows one or more components presented to the participant after login. The most important graphical components depict the steps of the activation process in which the participant is involved. Panel 700 may show a summary view of the phases to be undertaken in the entire process of the action (e.g. phase1, 710 and 720) and may present one or more fields (e.g. fields 712 and 722) to respectively provide descriptions of the phases.

A system embodying the invention may guide the participant through several types of information. For example, the system allows the participant to access the workflow information, help information about the workflow, the progress status, frequently asked questions and their answers and any type of information that enables the participant to correctly interact with the system.

In FIG. 7A, block 720 shows an example of graphical component depicting a phase in the activation process, whereas block 730, 732, 734, 736 and 738 depict steps each of which, in this example, is a Rosettanet™ PIP. FIG. 7A illustrates how embodiments of the invention guide a user through accessing information at any depth level. A participant starting with a login page may learn about the phases of an activation process, learn the steps involved in each of the phases, and learn how to proceed in completing the requirements for the activation. In addition, the system provides status information and also allows the participant to complete the requirements in more than one session. For example, a representative of business partner may fill out a questionnaire in one session, while a different representative may fill out a different requirement, eventually at a different time.

FIG. 7B depicts how a system embodying the invention allows a participant to view workflow information. For example, PIP 734 graphical component is expanded in component 740 to show the stages of implementation of the process 734 in terms of implementation, testing and migration (as described above).

In embodiments of the invention, workflow is closely tied to time settings and task schedules allowing the system to associate task completions with respect to dates. Time information may be provided as estimated completion dates (e.g. field 750 and date data 752), time to completion (e.g. days left to complete a step) or any other depiction that facilitates the viewing of the time information associated with workflow.

A system embodying the invention is enabled with alert capabilities. The latter allow the system to generate messages designed to inform the involved parties about workflow issues. For example, the system may issue an alert with regard to an approaching deadline, a past due task or any other time-related or sequence-related matter that involves workflow. The alerts may be an electronic text message such as electronic mail and instant messaging, a multimedia data such as voice mail, or any other type of communication data.

In addition to self-registration and data access capabilities, a system embodying the invention may generate real-time reports with details of participant readiness assessment, integration plans, and individual process implementation schedules.

Thus an example of an improved system and method for workflow enabled link activation has been described. The claims, however, and the full scope of any equivalents are what define the invention set forth herein.

What is claimed is:

1. A method for gateway activation to enable electronic trading, said method comprising:
   executing phases of a project, said executing phases of the project comprising:
      a processor of a computer executing an assessment planning phase of the phases of the project, said executing the assessment planning phase comprising planning activation of at least one gateway linking each trade participant of a plurality of trade participants with at least one sub-business entity of a business entity for electronic trading between each trade participant and the at least one sub-business entity via at least one trading platform having an infrastructure protocol,
      after said executing the assessment planning phase, said processor executing a readiness assessment phase of the phases of the project, said executing the readiness assessment phase comprising assessing readiness of each trade participant to be linked with the at least one sub-business entity,
      after said executing the readiness assessment phase, said processor executing an implementation phase of the phases of the project, said executing the implementation phase comprising selecting electronic protocols, products, and at least one electronic process for conducting said electronic trading,
      after said executing the implementation phase, said processor executing a testing phase of the phases of the project, said executing the testing phase comprising testing conduct of trade transactions using the at least one electronic process, said testing covering all interfaces to the at least one gateway including exception handling interfaces, wherein said testing comprises:
         volume testing comprising ascertaining that each trade participant can generate peak volume production that the business entity expects to be receiving from each trade participant and that the business entity can accept the peak volume production;
         choreography testing comprising ascertaining that a system of the business entity and a system of each trade participant are able to validate all messages exchanged therebetween and to process said all messages in a sequence in which the messages of said all messages are received;
         security and connectivity testing comprising ascertaining that the business entity and each trade participant are able to encrypt data and securely authenticate users as the users log onto the system of the business entity and the system of each trade participant, respectively;
         negative testing comprising ascertaining that the system of the business entity and the system of each trade participant are able to generate a rejection message for rejecting data that cannot be validated and that the system of each trade participant is able to receive an action that requires the system of each trade participant to carry out a given task which should be turned down;
         large file testing comprising ascertaining that the system of the business entity and the system of each trade participant are able to send and receive a largest file expected to be used, and
      after said executing the testing phase, said processor executing a migration phase of the phases of the project, said executing the migration phase comprising migrating processing components of the at least one electronic process to a production environment for conducting said electronic trading,
   after said executing phases of the project, (i) said processor activating the at least one gateway, said activating linking each trade participant with the at least one sub-business entity and (ii) said processor executing electronic trading between each trade participant and the at least one sub-business entity via at least one trading platform having an infrastructure protocol.

2. The method of claim 1, wherein said planning comprises:
   assembling requirements for said activating the at least one gateway, said requirements comprising tasks and rules that each trade participant should fulfill prior to said activating;
   gathering information that defines each trade participant's technology and technological readiness;

grouping each trade participant by an attribute associated with all elements of a community;

preparing agreements which each trade participant must review and agree to in order to continue with the phases of the project; and providing each trade participant with a plurality of questions concerning each trade participant's infrastructure in order to obtain information that helps establish a list of requirements for configuring a gateway of the at least one gateway.

3. The method of claim 1, wherein said assessing readiness comprises reviewing and generating reports pertaining to progress of the phases of the project.

4. The method of claim 1, wherein the the method further comprises said processor displaying a community manager user interface panel to a community manager, and wherein the panel comprises:

a first array comprising the trade participants of the plurality of trade participants;

a second array of processes comprising a first phase of the phases and a plurality of partner interface processes (PIP) associated with the project, said second array oriented perpendicular to said first array;

a third array of widget icons, each widget icon associated with a corresponding trade participant in the first array, said third array oriented parallel to and adjacent the first array, each widget icon configured to be marked to indicate whether each corresponding trade participant is involved in the project;

a two-dimensional array of cell icons, each cell icon at a unique cell representing an intersection of a trade participant in the first array and a process in the second array, each cell icon configured to be marked to indicate whether the process at the unique cell of the cell icon has been completed by the trade participant at the unique cell of the cell icon, wherein a cell icon of a unique cell for a specific PIP in the second array and a specific trade participant in the first array is configured to be marked with a specific color to indicate a warning for the specific PIP.

5. The method of claim 1, wherein the method further comprises said processor displaying a community manager drilldown interface panel to a community manager, wherein the panel is specific to a specific trade participant of the plurality of trade participants and to a specific phase of the phases, and wherein the panel comprises:

an indicator of the specific trade participant;

a first array of processes comprising a given phase of the phases and a plurality of partner interface processes (PIP) associated with the project;

a second array comprising headers for: a text description, a process status, a user's notes, and a succeeding step to be performed, said second array oriented perpendicular to said first array;

a third array of widget icons, each widget icon associated with a corresponding process in the first array, said third array oriented parallel to and adjacent the first array, each widget icon configured to be marked to indicate whether each corresponding process has been completed; and a two-dimensional array of cell icons, each cell icon at a unique cell representing an intersection of a process in the first array and a header in the second array, each cell icon associated with a process in the first array and a header in the second array other than the header for a process status being configured to having text inserted therein, each cell icon associated with the header in the second array for a process status configured to be marked to indicate a status of its associated process in the first array.

6. The method of claim 1, wherein the method further comprises said processor displaying a trading participant interface panel to a specific trade participant, and wherein the panel comprises:

an indicator of each phase of the phases;

a description of each phase of the phases, each description adjacent the indicator of the phase corresponding to each description;

a first array comprising steps for a specific phase of the phases;

a second array of widget icons, each widget icon associated with a corresponding step in the first array, said second array oriented parallel to and adjacent the first array, each widget icon in the second array configured to be marked to indicate whether each corresponding step in the first array has been completed.

7. The method of claim 1, wherein the method further comprises said processor displaying a trading participant interface panel to a specific trade participant, and wherein the panel comprises:

an indicator of each phase of the phases;

a description of each phase of the phases, each description adjacent the indicator of the phase corresponding to each description;

for a specific phase of the phases:

a partner interface process (PIP) indicator associated with the project;

stages of implementation, testing, and migration for the PIP indicator;

an estimated completion date for each stage of said stages.

8. The method of claim 1, wherein the at least one sub-business entity comprises a first sub-business entity, a second sub-business entity, and a third sub-business entity;

wherein the at least one trading platform comprises a first trading platform, a second trading platform, and a third trading platform;

wherein the plurality of trade participants comprises a first trade participant, a second trade participant, a third trade participant, and a fourth trade participant;

wherein said activating at least one gateway for the first trade participant, the second trade participant, the third trade participant, and the fourth trade participant results in:

the first trade participant being linked to the third sub-business entity via the first trading platform and to both the first sub-business entity and the third sub-business entity via the second trading platform;

the second trade participant being linked to the third sub-business entity via the first trading platform and to the second sub-business entity via the third trading platform;

the third trade participant being linked to both the first sub-business entity and the third sub-business entity via the second trading platform;

the fourth trade participant being linked to the second sub-business entity via the third trading platform.

9. A system comprising: a processor and a computer readable memory unit coupled to the processor, said memory unit containing program code configured to be executed by the processor to implement a method for gateway activation to enable electronic trading, said method comprising:

executing phases of a project, said executing phases of the project comprising:

said processor executing an assessment planning phase of the phases of the project, said executing the assessment planning phase comprising planning activation of at least one gateway linking each trade participant of a plurality of trade participants with at least one sub-business entity of a business entity for electronic trading between each trade participant and the at least one sub-business entity via at least one trading platform having an infrastructure protocol, after said executing the assessment planning phase, said processor executing a readiness assessment phase of the phases of the project, said executing the readiness assessment phase comprising assessing readiness of each trade participant to be linked with the at least one sub-business entity, after said executing the readiness assessment phase, said processor executing an implementation phase of the phases of the project, said executing the implementation phase comprising selecting electronic protocols, products, and at least one electronic process for conducting said electronic trading, after said executing the implementation phase, said processor executing a testing phase of the phases of the project, said executing the testing phase comprising testing conduct of trade transactions using the at least one electronic process, said testing covering all interfaces to the at least one gateway including exception handling interfaces, wherein said testing comprises:

volume testing comprising ascertaining that each trade participant can generate peak volume production that the business entity expects to be receiving from each trade participant and that the business entity can accept the peak volume production;

choreography testing comprising ascertaining that a system of the business entity and a system of each trade participant are able to validate all messages exchanged therebetween and to process said all messages in a sequence in which the messages of said all messages are received;

security and connectivity testing comprising ascertaining that the business entity and each trade participant are able to encrypt data and securely authenticate users as the users log onto the system of the business entity and the system of each trade participant, respectively;

negative testing comprising ascertaining that the system of the business entity and the system of each trade participant are able to generate a rejection message for rejecting data that cannot be validated and that the system of each trade participant is able to receive an action that requires the system of each trade participant to carry out a given task which should be turned down;

large file testing comprising ascertaining that the system of the business entity and the system of each trade participant are able to send and receive a largest file expected to be used, and after said executing the testing phase, said processor executing a migration phase of the phases of the project, said executing the migration phase comprising migrating processing components of the at least one electronic process to a production environment for conducting said electronic trading, after said executing phases of the project, (i) said processor activating the at least one gateway, said activating linking each trade participant with the at least one sub-business entity and (ii) said processor executing electronic trading between each trade participant and the at least one sub-business entity via at least one trading platform having an infrastructure protocol.

10. The system of claim 9, wherein said planning comprises:

assembling requirements for said activating the at least one gateway, said requirements comprising tasks and rules that each trade participant should fulfill prior to said activating;

gathering information that defines each trade participant's technology and technological readiness;

grouping each trade participant by an attribute associated with all elements of a community;

preparing agreements which each trade participant must review and agree to in order to continue with the phases of the project; and providing each trade participant with a plurality of questions concerning each trade participant's infrastructure in order to obtain information that helps establish a list of requirements for configuring a gateway of the at least one gateway.

11. The system of claim 9, wherein said assessing readiness comprises reviewing and generating reports pertaining to progress of the phases of the project.

12. The system of claim 9, wherein the method further comprises said processor displaying a community manager user interface panel to a community manager, and wherein the panel comprises:

a first array comprising the trade participants of the plurality of trade participants;

a second array of processes comprising a first phase of the phases and a plurality of partner interface processes (PIP) associated with the project, said second array oriented perpendicular to said first array;

a third array of widget icons, each widget icon associated with a corresponding trade participant in the first array, said third array oriented parallel to and adjacent the first array, each widget icon configured to be marked to indicate whether each corresponding trade participant is involved in the project;

a two-dimensional array of cell icons, each cell icon at a unique cell representing an intersection of a trade participant in the first array and a process in the second array, each cell icon configured to be marked to indicate whether the process at the unique cell of the cell icon has been completed by the trade participant at the unique cell of the cell icon, wherein a cell icon of a unique cell for a specific PIP in the second array and a specific trade participant in the first array is configured to be marked with a specific color to indicate a warning for the specific PIP.

13. The system of claim 9, wherein the method further comprises said processor displaying a community manager drilldown interface panel to a community manager, wherein the panel is specific to a specific trade participant of the plurality of trade participants and to a specific phase of the phases, and wherein the panel comprises:

an indicator of the specific trade participant;

a first array of processes comprising a given phase of the phases and a plurality of partner interface processes (PIP) associated with the project;

a second array comprising headers for: a text description, a process status, a user's notes, and a succeeding step to be performed, said second array oriented perpendicular to said first array;

a third array of widget icons, each widget icon associated with a corresponding process in the first array, said third array oriented parallel to and adjacent the first array, each widget icon configured to be marked to indicate whether each corresponding process has been completed; and a two-dimensional array of cell icons, each cell icon at a unique cell representing an intersection of a process in the first array and a header in the second array, each cell icon associated with a process in the first array and a header in the second array other than the header for a process status being configured to having text inserted therein, each cell icon associated with the header in the second array for a process status configured to be marked to indicate a status of its associated process in the first array.

14. The system of claim 9, wherein the method further comprises said processor displaying a trading participant interface panel to a specific trade participant, and wherein the panel comprises:

an indicator of each phase of the phases;

a description of each phase of the phases, each description adjacent the indicator of the phase corresponding to each description;

a first array comprising steps for a specific phase of the phases;

a second array of widget icons, each widget icon associated with a corresponding step in the first array, said second array oriented parallel to and adjacent the first array, each widget icon in the second array configured to be marked to indicate whether each corresponding step in the first array has been completed.

15. The system of claim 9, wherein the method further comprises said processor displaying a trading participant interface panel to a specific trade participant, and wherein the panel comprises:

an indicator of each phase of the phases;

of phases, each description adjacent the indicator of the phase corresponding to each description;

for a specific phase of the phases:

a partner interface process (PIP) indicator associated with the project;

stages of implementation, testing, and migration for the PIP indicator;

an estimated completion date for each stage of said stages.

16. The system of claim 9, wherein the at least one sub-business entity comprises a first sub-business entity, a second sub-business entity, and a third sub-business entity;

wherein the at least one trading platform comprises a first trading platform, a second trading platform, and a third least one plurality of trade participants comprises a first trade participant, a second trade participant, a third trade participant, and a fourth trade participant;

wherein said activating at least one gateway for the first trade participant, the second trade participant, the third trade participant, and the fourth trade participant results in:

the first trade participant being linked to the third sub-business entity via the first trading platform and to both the first sub-business entity and the third sub-business entity via the second trading platform;

the second trade participant being linked to the third sub-business entity via the first trading platform and to the second sub-business entity via the third trading platform;

the third trade participant being linked to both the first sub-business entity and the third sub-business entity via the second trading platform;

the fourth trade participant being linked to the second sub-business entity via the third trading platform.

* * * * *